United States Patent
Lucas et al.

(10) Patent No.: US 7,539,891 B2
(45) Date of Patent: May 26, 2009

(54) SWITCHED FC-AL FAULT TOLERANT TOPOLOGY

(75) Inventors: Gregg Steven Lucas, Tucson, AZ (US); Carl Evan Jones, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 945 days.

(21) Appl. No.: 10/871,811

(22) Filed: Jun. 18, 2004

(65) Prior Publication Data

US 2005/0281273 A1   Dec. 22, 2005

(51) Int. Cl.
*G06F 11/00* (2006.01)

(52) U.S. Cl. .......................................................... 714/4

(58) Field of Classification Search ................... 714/4; 370/221, 222
See application file for complete search history.

(56) References Cited

U.S. PATENT DOCUMENTS

| | | | |
|---|---|---|---|
| 5,991,891 A * | 11/1999 | Hahn et al. ..................... 714/4 |
| 6,057,863 A | 5/2000 | Olarig | |
| 6,243,386 B1 | 6/2001 | Chan et al. | |
| 6,477,171 B1 | 11/2002 | Wakeley et al. | |
| 6,504,817 B2 * | 1/2003 | Oldfield et al. ............. 370/217 |
| 6,578,158 B1 | 6/2003 | Deitz et al. | |
| 7,280,485 B2 * | 10/2007 | Suenaga ..................... 370/241 |
| 2002/0044562 A1 | 4/2002 | Killen, Jr. et al. | |
| 2002/0129232 A1 | 9/2002 | Coffey | |
| 2002/0133736 A1 | 9/2002 | Faber et al. | |
| 2003/0005352 A1 * | 1/2003 | Beer et al. ..................... 714/4 |
| 2003/0137987 A1 | 7/2003 | Beer et al. | |

* cited by examiner

*Primary Examiner*—Marc Duncan
(74) *Attorney, Agent, or Firm*—Quarles & Brady LLP

(57) ABSTRACT

A computer system uses a Fiber Channel Arbitrated Loop (FC-AL) network to communicate with mass storage devices. The FC-AL network provides alternative communication paths to the mass storage devices. The FC-AL communication network includes a first (60) FC-AL controller within the FC-AL switch (50). A first FC-AL mass storage drive (56) has second (80) and third (82) FC-AL controllers. A first output of the first FC-AL controller is coupled to a first input of the second FC-AL controller, and a second output of the first FC-AL controller is coupled to a first input of the third FC-AL controller. A second FC-AL mass storage drive (94) has fourth (96) and fifth (98) FC-AL controllers. A first output of the second FC-AL controller is coupled to a first input of the fourth FC-AL controller, and a first output of the third FC-AL controller is coupled to a first input of the fifth FC-AL controller. The alternative communication paths to the mass storage devices reduces incident of disk drive access failure.

13 Claims, 3 Drawing Sheets

SWITCHED FC-AL FAULT TOLERANT TOPOLOGY

FIELD OF THE INVENTION

The present invention relates to data storage devices, and more particularly, to a switched Fibre Channel communication topology between a computer system and the data storage device.

BACKGROUND OF THE INVENTION

Computer systems generally use mass storage devices to store and retrieve data for processing by the computer system. Certain high-end computer systems require very large data capacity. Large storage capacity disk drives are typically stand-alone units, e.g. disk drive enclosures or automated data storage libraries, and require some type of communication link to transfer data back and forth between the computer and the mass storage drive. One common communication protocol is known as Fibre Channel (FC), which is an established standard as per ANSI X3.230-1994. Fibre channel offers a number of advantages for disk topology and storage systems. Fibre Channel is a high speed serial data transfer architecture for transmitting data at rates of 1-2 giga-bits per second (Gbps) and higher. Fibre Channel offers point-to-point, switched, and loop interfaces. A common Fibre Channel standard is Fibre Channel Arbitrated Loop (FC-AL), which is designed for mass storage devices and other peripheral devices that require very high bandwidth. FC-AL supports full-duplex data transfer and uses optical fiber or coaxial cable as the physical medium to connect devices.

FC-AL uses a loop topology, wherein a message or token is placed on the loop by a source device and routed to a destination device as specified an address in the message. The message can contain control instruction and data, which are transferred around the loop between source and destination devices. FC-AL is a well-established, efficient, and flexible communication protocol. However, as with many communication links, FC-AL is subject to hardware failures. If the loop breaks, then the message may not be received. In addition, it may be difficult to locate the Fibre Channel disconnection or break in the loop. One solution is to use a dual-loop implementation. If one loop goes down, then the other loop should be available. Unfortunately, many manufacturers choose to put both FC loops on the same integrated circuit (IC). If the IC fails, then both loops may go down. Additionally, a single device or node, e.g., disk drive, can be connected to both loops whereby a single failure can render both loops inoperable.

Another implementation of Fibre Channel is known as switched FC-AL, in which every device, e.g., disk drive, is connected to a switching node which is in the center of a star configuration. Hardware failures are much easier to detect and handle with the switched FC-AL, because every point of failure can be identified. The system can determine which disk drives cannot communicate.

As a further feature, some switched FC-ALs use cascaded switches connected to trunking links. There are two or more links between the trunk and each disk drive. The cascaded switches allow multiple operations to occur at a time between the trunk and the disk drive, one operation for each link. The cascaded switches increase the bandwidth of data transfer by factor of the number of links.

Due to the high cost associated with switched FC-AL, it is common for users to daisy chain multiple disk drives off one or more FC loops. FIG. 1 illustrates two links between trunk 12 and disk drive 14. FC loop 16 connects from a first controller in trunk 12 to disk drive 14, and FC loop 18 connects from a second controller in trunk 12 to disk drive 14. Additional disk drives 20, 22, and 24 are daisy-chained from disk drive 14 for economies of scale within each FC loop. Because of the daisy-chaining configuration, if disk drive 14 fails, disk drives 20-24 are also taken out of service. Even though FC loops 16 and 18 from the controllers of trunk 12 are operational, a failure of disk drive 14 disables communication with disk drives 20-24. A failure of any one drive in the daisy chain disables all disk drives downstream from the failed drive, even though the downstream disk drives are otherwise operational.

What is needed is a communication topology which does not unnecessarily disable communication with down-stream disk drives.

SUMMARY OF THE INVENTION

A computer system uses an FC-AL network to communicate with mass storage devices. The FC-AL network provides alternative communication paths to the mass storage devices. The alternative communication paths to the mass storage devices reduces incident of disk drive access problems.

In one embodiment, the invention is an FC-AL communication network comprising a first FC-AL controller. A first FC-AL mass storage drive has second and third FC-AL controllers. A first output of the first FC-AL controller is coupled to a first input of the second FC-AL controller, and a second output of the first FC-AL controller is coupled to a first input of the third FC-AL controller. A second FC-AL mass storage drive has fourth and fifth FC-AL controllers. A first output of the second FC-AL controller is coupled to a first input of the fourth FC-AL controller, and a first output of the third FC-AL controller is coupled to a first input of the fifth FC-AL controller.

In another embodiment, the invention is a Fibre Channel Arbitrated Loop (FC-AL) communication network comprising first and second FC-AL controllers. A first FC-AL mass storage drive has third and fourth FC-AL controllers. A first output of the first FC-AL controller is coupled to a first input of the third FC-AL controller, and a first output of the second FC-AL controller is coupled to a second input of the third FC-AL controller. A second output of the first FC-AL controller is coupled to a first input of the fourth FC-AL controller, and a second output of the second FC-AL controller is coupled to a second input of the fourth FC-AL controller.

In another embodiment, the invention is a communication network comprising first and second controllers. First and second mass storage drives each have a controller coupled to the first and second controllers. Third and fourth mass storage drives each have a controller. A connection network is coupled between the controllers of the first and second mass storage drives and the controllers of the third and fourth mass storage drives. The connection network provides alternative paths between the controllers of the first and second mass storage drives and the controllers of the third and fourth mass storage drives.

In yet another embodiment, the invention is a method of connecting a communication network comprising providing a first controller, providing a first mass storage drive having second and third controllers, routing a first output of the first controller to a first input of the second controller, routing a second output of the first controller to a first input of the third controller, providing a second mass storage drive having fourth and fifth controllers, routing a first output of the second controller to a first input of the fourth controller, and routing a first output of the third controller to a first input of the fifth controller.

DETAILED DESCRIPTION OF THE INVENTION

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims.

Figure 1:
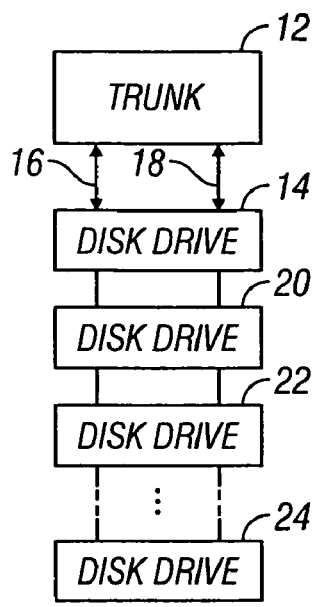
FIG. 1 is a block diagram representing a known trunking configuration.
Figure 2:
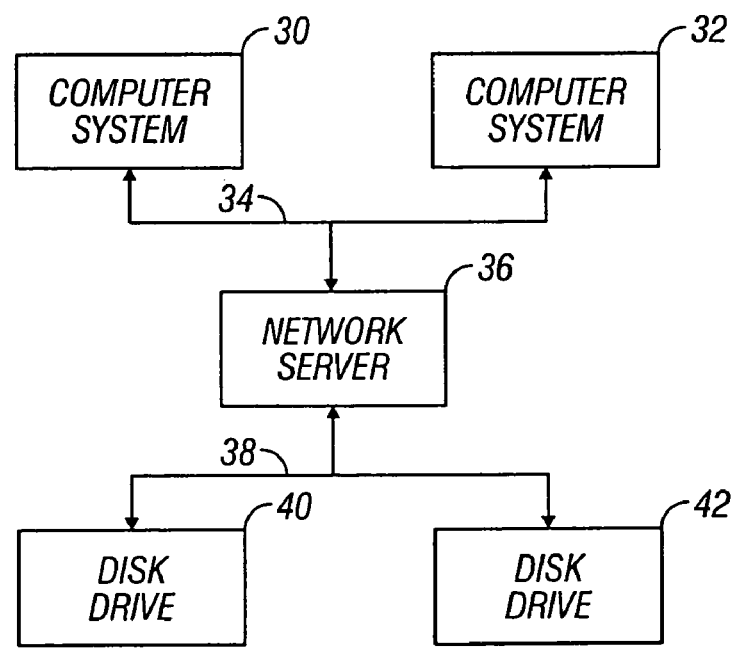
FIG. 2 is a block diagram of a computer system using Fibre Channel communication link.

Referring to FIG. 2, computer systems 30 and 32 are shown as general personal computers, workstations, or mainframe computer systems. Computers 30 and 32 are connected through Internet Protocol (IP) network 34 to network server 36. IP network 34 may be one or more Ethernet connections. Network server 36 contains a Fibre Channel (FC) communication controller card for connection to FC communication link 38. FC communication link 38 may be implemented with coaxial cable or optical fiber. FC communication link 38 connects to disk drives 40 and 42. Computers 30 and 32 can store data on disk drives 40 and 42. The data is sent from computer 30 or 32 to network server 36, which in turn forwards the data over FC communication link 38 for storage on disk drive 40 or 42. Computers 30 and 32 can make requests for data from disk drives 40 and 42. Network server 36 retrieves the data from disk drive 40 or 42 over FC communication link 38 and returns the data to computer 30 or 32.

Figure 3:
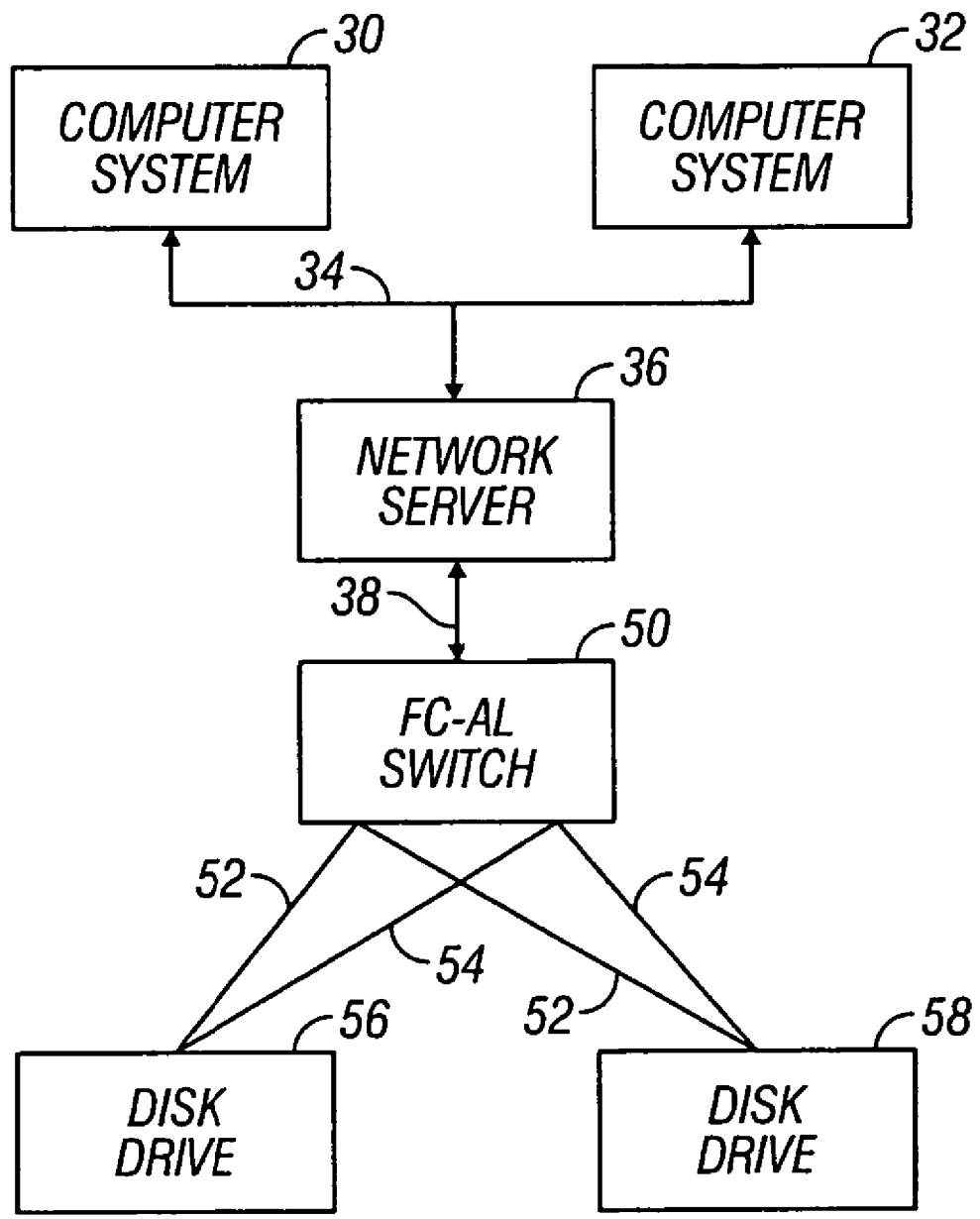
FIG. 3 is a block diagram of the computer system using a switched Fibre Channel communication network.

In FIG. 3, network server 36 contains a Fibre Channel communication controller card for connection to FC communication link 38. FC communication link 38 connects to Fibre Channel Arbitrated Loop (FC-AL) switch 50. FC-AL switch 50 provides FC loop 52 and FC loop 54. FC loop 52 connects to disk drive 56 and disk drive 58. Likewise, FC loop 54 connects to disk drive 56 and disk drive 58. In the present discussion, the term disk drive is used to describe individual hard disk drives, very large mass storage devices associated with a large system, e.g. disk drive enclosures or automated data storage libraries, and any other mass storage device. Computers 30 and 32 can store data on disk drives 56 and 58. The data is sent from computer 30 or 32 to network server 36, which in turn forwards the data over FC loop 52 or FC loop 54 for storage on disk drive 56 or 58. Computers 30 and 32 can make requests for data from disk drives 56 and 58. Network server 36 retrieves the data from disk drive 56 or 58 over FC loop 52 or FC loop 54 and returns the data to computer 30 or 32. FC loops 52 and 54 create alternative paths to communicate through FC-AL switch 50 to disk drives 56 and 58. If one FC loop fails or otherwise becomes inoperative, the other FC loop provides access to the disk drive.

Figure 4:
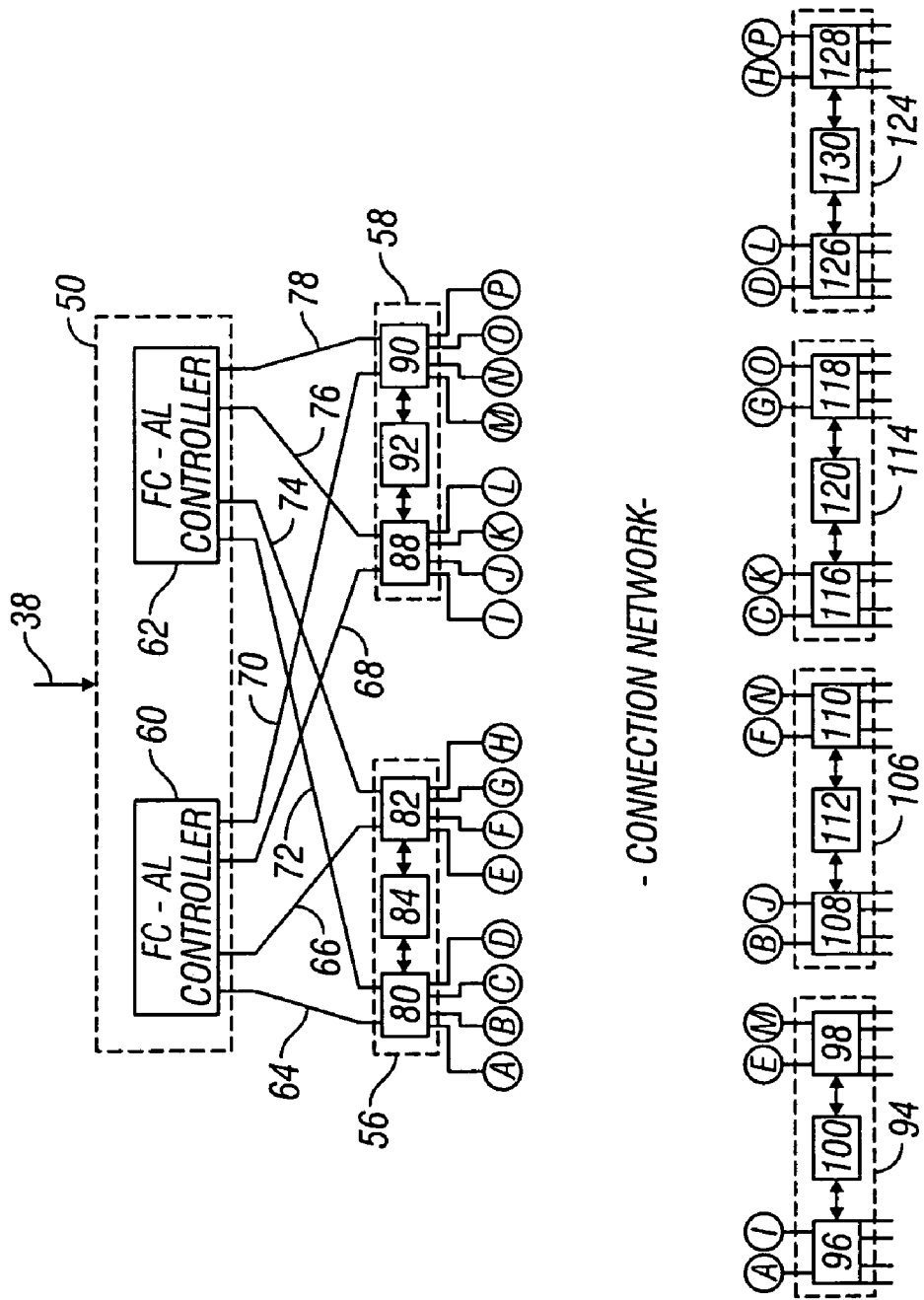
FIG. 4 is a block diagram of the switched Fibre Channel with alternative communication paths to multiple disk drives.

Further detail of FC-AL switch 50 and the alternative communication paths are shown in FIG. 4. FC-AL switch 50 includes FC-AL controller 60 and FC-AL controller 62. FC-AL controller 60 has four FC loops 64, 66, 68, and 70. FC-AL controller 62 has four FC loops 72, 74, 76, and 78. Each FC loop described herein has two conductors or optical fibers; one source conductor and one return conductor. FC-AL disk drive 56 includes two FC-AL controllers 80 and 82. FC-AL controllers 80 and 82 are each connected to mass storage 84. Mass storage device 84 can be magnetic media (magnetic tape or hard disks), optical media (optical tape or disks), and electronic media (PROM, EEPROM, flash PROM). FC loop 64 from controller 60 is connected to a first input of controller 80. FC loop 72 from controller 62 is connected to a second input of controller 80. FC loop 66 from controller 60 is connected to a first input of controller 82. FC loop 74 from controller 62 is connected to a second input of controller 82. FC-AL disk drive 58 includes two FC-AL controllers 88 and 90. FC-AL controllers 88 and 90 are each connected to mass storage 92. Mass storage device 92 can be magnetic media, optical media, and electronic media. FC loop 68 from controller 60 is connected to a first input of controller 88. FC loop 76 from controller 62 is connected to a second input of controller 88. FC loop 70 from controller 60 is connected to a first input of controller 90. FC loop 78 from controller 62 is connected to a second input of controller 90.

FC-AL disk drive 94 is routed from FC-AL disk drives 56 and 58 through a point-to-point connection network A-P. In the connection network, node A from a first output of controller 80 connects to node A at a first input of controller 96, node B from a second output of controller 80 connects to node B at a first input of controller 108, node C from a third output of controller 80 connects to node C at a first input of controller 116, and so on. Disk drive 94 includes two FC-AL controllers 96 and 98. FC-AL controllers 96 and 98 are each connected to mass storage device 100. Mass storage device 100 can be magnetic media, optical media, and electronic media. An output A from controller 80 is connected to a first input of controller 96. An output I from controller 88 is connected to a second input of controller 96. An output E from controller 82 is connected to a first input of controller 98. An output M from controller 90 is connected to a second input of controller 98.

FC-AL disk drive 106 is also routed from FC-AL disk drives 56 and 58 through the point-to-point connection network A-P. Disk drive 106 includes two FC-AL controllers 108 and 110. FC-AL controllers 108 and 110 are each connected to mass storage device 112. Mass storage device 112 can be magnetic media, optical media, and electronic media. An output B from controller 80 is connected to a first input of controller 108. An output J from controller 88 is connected to a second input of controller 108. An output F from controller 82 is connected to a first input of controller 110. An output N from controller 90 is connected to a second input of controller 110.

In a similar manner, FC-AL disk drive 114 is routed from FC-AL disk drives 56 and 58 through the point-to-point connection network A-P. Disk drive 114 includes two FC-AL controllers 116 and 118. FC-AL controllers 116 and 118 are each connected to mass storage device 120. Mass storage device 120 can be magnetic media, optical media, and electronic media. An output C from controller 80 is connected to a first input of controller 116. An output K from controller 88 is connected to a second input of controller 116. An output G from controller 82 is connected to a first input of controller 118. An output O from controller 90 is connected to a second input of controller 118.

Likewise, FC-AL disk drive 124 is routed from FC-AL disk drives 56 and 58 through the point-to-point connection network A-P. Disk drive 124 includes two FC-AL controllers 126 and 128. FC-AL controllers 126 and 128 are each connected to mass storage device 130. Mass storage device 130 can be magnetic media, optical media, and electronic media. An output D from controller 80 is connected to a first input of controller 126. An output L from controller 88 is connected to a second input of controller 126. An output H from controller 82 is connected to a first input of controller 128. An output P from controller 90 is connected to a second input of controller 128.

FC loops 64-78 are routed to FC-AL controllers 80, 82, 88, and 90, as shown. The inputs of controllers 80-90 are routed to the associated mass storage devices and are further routed to their four available outputs, according to FC standards. The outputs of controllers 80-90 are routed to controllers 96-128, through the connection network A-P as shown, thereby creating alternative communication paths to the mass storage devices.

A feature of the FC loop configuration described in FIG. 4 is the alternative communication paths for FC-AL disk drives 56 and 58, and for FC-AL disk drives 94, 106, 114, and 124, through the connection network A-P. Mass storage device 84 can be accessed through the path from controller 60 to controller 80 by way of loop 64, or through the path from controller 62 to controller 80 by way of loop 72. Mass storage device 84 can also be accessed through the path from controller 60 to controller 82 by way of loop 66, or through the path from controller 62 to controller 82 by way of loop 74. Mass storage device 92 can be accessed through the path from controller 60 to controller 88 by way of loop 68, or through the path from controller 62 to controller 88 by way of loop 76. Mass storage device 92 can also be accessed through the path from controller 60 to controller 90 by way of loop 70, or through the path from controller 62 to controller 90 by way of loop 78.

Mass storage device 100 can be accessed from controller 60 through controller 80 or 82 of disk drive 56, or through controller 88 or 90 of disk drive 58, which connects to both controller 96 and controller 98 of disk drive 94 through the connection network A-P. Mass storage device 112 can be accessed from controller 60 through controller 80 or 82 of disk drive 56, or through controller 88 or 90 of disk drive 58, which connects to both controller 108 and controller 110 of disk drive 106 through the connection network A-P. Mass storage device 120 can be accessed from controller 60 through controller 80 or 82 of disk drive 56, or through controller 88 or 90 of disk drive 58, which connects to both controller 116 and controller 118 of disk drive 114 through the connection network A-P. Mass storage device 130 can be accessed from controller 60 through controller 80 or 82 of disk drive 56, or through controller 88 or 90 of disk drive 58, which connects to both controller 126 and controller 128 of disk drive 124 through the connection network A-P.

If any one FC-AL disk drive in the chain fails, is removed, or otherwise becomes inoperative, then a connection can be established through an alternate path. For example, if loop 64 fails or otherwise becomes inoperative, then mass storage device 84 can be accessed through loop 66 by way of controller 82. If loop 66 fails or otherwise becomes inoperative, then mass storage device 84 can be accessed through loop 64 by way of controller 80. If controller 60 fails such that both loops 64 and 66 are inoperative, then mass storage device 84 can be accessed from controller 62 by way of loop 72 to controller 80, or by way of loop 74 to controller 82.

If loop 68 fails or otherwise becomes non-operative, then mass storage device 92 can be accessed through loop 70 by way of controller 90. If loop 70 fails or otherwise becomes inoperative, then mass storage device 92 can be accessed through loop 68 by way of controller 88. If controller 60 fails such that both loops 68 and 70 are inoperative, then mass storage device 92 can be accessed from controller 62 by way of loop 76 to controller 88, or by way of loop 78 to controller 90.

As for disk drive 94, if controller 80 fails or otherwise becomes inoperative, then mass storage device 100 can be accessed through the loop from the output E of controller 82 to the first input of controller 98. If controller 82 fails or otherwise becomes inoperative, then mass storage device 100 can be accessed through the output A of controller 80 to the first input of controller 96. If disk drive 56 fails such that both controller 80 and controller 82 are inoperative, then mass storage device 100 can be accessed through controller 88 of disk drive 58 by the loop from the output I of controller 88 to the second input of controller 96. If disk drive 56 fails such that both controller 80 and controller 82 are inoperative, and controller 88 is also inoperative, then mass storage device 100 can be accessed through controller 90 by the loop from the output M of controller 90 to the second input of controller 98.

As for disk drive 106, if controller 80 fails or otherwise becomes inoperative, then mass storage device 112 can be accessed through the loop from the output F of controller 82 to the first input of controller 110. If controller 82 fails or otherwise becomes inoperative, then mass storage device 112 can be accessed through the output B of controller 80 to the first input of controller 108. If disk drive 56 fails such that both controller 80 and controller 82 are inoperative, then mass storage device 112 can be accessed through controller 88 of disk drive 58 by the loop from the output J of controller 88 to the second input of controller 108. If disk drive 56 fails such that both controller 80 and controller 82 are inoperative, and controller 88 is also inoperative, then mass storage device 112 can be accessed through controller 90 by the loop from the output N of controller 90 to the second input of controller 110.

As for disk drive 114, if controller 80 fails or otherwise becomes inoperative, then mass storage device 120 can be accessed through the loop from the output G of controller 82 to the first input of controller 118. If controller 82 fails or otherwise becomes inoperative, then mass storage device 120 can be accessed through the output C of controller 80 to the first input of controller 116. If disk drive 56 fails such that both controller 80 and controller 82 are inoperative, then mass storage device 120 can be accessed through controller 88 of disk drive 58 by the loop from the output K of controller 88 to the second input of controller 116. If disk drive 56 fails such that both controller 80 and controller 82 are inoperative, and controller 88 is also inoperative, then mass storage device 120 can be accessed through controller 90 by the loop from the output O of controller 90 to the second input of controller 118.

As for disk drive 124, if controller 80 fails or otherwise becomes inoperative, then mass storage device 130 can be accessed through the loop from the output H of controller 82 to the first input of controller 128. If controller 82 fails or otherwise becomes inoperative, then mass storage device 130 can be accessed through the output D of controller 80 to the first input of controller 126. If disk drive 56 fails such that both controller 80 and controller 82 are inoperative, then mass storage device 130 can be accessed through controller 88 of disk drive 58 by the loop from the output L of controller 88 to the second input of controller 126. If disk drive 56 fails such that both controller 80 and controller 82 are inoperative, and controller 88 is also inoperative, then mass storage device 130 can be accessed through controller 90 by the loop from the output P of controller 90 to the second input of controller 128.

FC-AL disk drives 94, 106, 114, and 124 can be routed to a third level of FC-AL disk drives (not shown) further downstream by a similar configuration as described above. The alternative Fibre Channel communication paths reduce the incident of disk drive access problems because the drive has failed, been removed, or otherwise has become inoperative. The switched FC-AL topology increase fault tolerance for the computer system. The alternate communication paths also increase the bandwidth of the FC-AL topology.

While one or more embodiments of the present invention have been illustrated in detail, the skilled artisan will appreciate that modifications and adaptations to those embodiments may be made without departing from the scope of the present invention as set forth in the following claims.

What is claimed is:

1. A Fibre Channel Arbitrated Loop (FC-AL) communication network, comprising:
  a first FC-AL controller having at least four Fibre Channel (FC) loops as outputs;
  a first FC-AL mass storage drive having second and third FC-AL controllers, wherein each of the second and third FC-AL controllers have at least four Fibre Channel (FC) loops as outputs; and wherein a first output of the first FC-AL controller is coupled to a first input of the second FC-AL controller, and a second output of the first FC-AL controller is coupled to a first input of the third FC-AL controller; and
  a second FC-AL mass storage drive having fourth and fifth FC-AL controllers, wherein each of the fourth and fifth FC-AL controllers have at least four Fibre Channel (FC) loops as outputs; and wherein a first output of the second FC-AL controller is coupled to a first input of the fourth FC-AL controller, and a first output of the third FC-AL controller is coupled to a first input of the fifth FC-AL controller.

2. The FC-AL communication network of claim 1, further including:
  a first mass storage device coupled to the second FC-AL controller and to the third FC-AL controller; and
  a second mass storage device coupled to the fourth FC-AL controller and to the fifth FC-AL controller.

3. The FC-AL communication network of claim 1, further including a third FC-AL mass storage drive having sixth and seventh FC-AL controllers, wherein a second output of the second FC-AL controller is coupled to a first input of the sixth FC-AL controller, and a second output of the third FC-AL controller is coupled to a first input of the seventh FC-AL controller, and wherein the sixth and seventh FC-AL controllers each have at least four Fibre Channel (FC) loops as outputs.

4. The FC-AL communication network of claim 3, further including:
  an eighth FC-AL controller; and
  a fourth FC-AL mass storage drive having ninth and tenth FC-AL controllers, wherein a first output of the eighth FC-AL controller is coupled to a second input of the second FC-AL controller, a second output of the eighth FC-AL controller is coupled to a second input of the third FC-AL controller, a third output of the first FC-AL controller is coupled to a first input of the ninth FC-AL controller, a fourth output of the first FC-AL controller is coupled to a first input of the tenth FC-AL controller, a third output of the eighth FC-AL controller is coupled to a second input of the ninth FC-AL controller, and a fourth output of the eighth FC-AL controller is coupled to a second input of the tenth FC-AL controller,
wherein the eighth, ninth and tenth FC-AL controllers each have at least four Fibre Channel (FC) loops as outputs.

5. The FC-AL communication network of claim 4, further including:
  a fifth FC-AL mass storage drive having eleventh and twelfth FC-AL controllers, wherein a first output of the ninth FC-AL controller is coupled to a second input of the fourth FC-AL controller, a second output of the ninth FC-AL controller is coupled to a second input of the sixth FC-AL controller, a third output of the second FC-AL controller is coupled to a first input of the eleventh FC-AL controller, a third output of the ninth FC-AL controller is coupled to a second input of the eleventh FC-AL controller, a third output of the third FC-AL controller is coupled to a first input of the twelfth FC-AL controller, a second output of the tenth FC-AL controller is coupled to a second input of the seventh FC-AL controller, and a third output of the tenth FC-AL controller is coupled to a second of the twelfth FC-AL controller; and
  a sixth FC-AL mass storage drive having thirteenth and fourteenth FC-AL controllers, wherein a fourth output of the second FC-AL controller is coupled to a first input of the thirteenth FC-AL controller, a fourth output of the ninth FC-AL controller is coupled to a second input of the thirteenth FC-AL controller, a fourth output of the third FC-AL controller is coupled to a first input of the fourteenth FC-AL controller, and a fourth output of the tenth FC-AL controller is coupled to a second of the fourteenth FC-AL controller
wherein the eleventh, twelfth, thirteenth and fourteenth FC-AL controllers each have at least four Fibre Channel (FC) loops as outputs.

6. The FC-AL communication network of claim 5, further including:
  a first mass storage device coupled to the sixth FC-AL controller and to the seventh FC-AL controller;
  a second mass storage device coupled to the ninth FC-AL controller and to the tenth FC-AL controller;
  a third mass storage device coupled to the eleventh FC-AL controller and to the twelfth FC-AL controller; and
  a fourth mass storage device coupled to the thirteenth FC-AL controller and to the fourteenth FC-AL controller.

7. A Fibre Channel Arbitrated Loop (FC-AL) communication network, comprising:
  first and second FC-AL controllers, each FC-AL controller having at least four Fibre Channel (FC) loops as outputs; and
  a first FC-AL mass storage drive having third and fourth FC-AL controllers, wherein a first output of the first FC-AL controller is coupled to a first input of the third FC-AL controller, a first output of the second FC-AL controller is coupled to a second input of the third FC-AL controller, a second output of the first FC-AL controller is coupled to a first input of the fourth FC-AL controller, and a second output of the second FC-AL controller is coupled to a second input of the fourth FC-AL controller.

8. The FC-AL communication network of claim 7, further including a second FC-AL mass storage drive having fifth and sixth FC-AL controllers, each FC-AL controller having at least four Fibre Channel (FC) loops as outputs, wherein a third output of the first FC-AL controller is coupled to a first input of the fifth FC-AL controller, a third output of the second FC-AL controller is coupled to a second input of the fifth FC-AL controller, a fourth output of the first FC-AL controller is coupled to a first input of the sixth FC-AL controller, and a fourth output of the second FC-AL controller is coupled to a second input of the sixth FC-AL controller.

9. The FC-AL communication network of claim 8, further including:
   a first mass storage device coupled to the third FC-AL controller and to the fourth FC-AL controller; and
   a second mass storage device coupled to the fifth FC-AL controller and to the sixth FC-AL controller.

10. The FC-AL communication network of claim 8, further including a third FC-AL mass storage drive having seventh and eighth FC-AL controllers, each FC-AL controller having at least four Fibre Channel (FC) loops as outputs, wherein a first output of the third FC-AL controller is coupled to a first input of the seventh FC-AL controller, a first output of the fifth FC-AL controller is coupled to a second input of the seventh FC-AL controller, a first output of the fourth FC-AL controller is coupled to a first input of the eighth FC-AL controller, and a first output of the sixth FC-AL controller is coupled to a second input of the eighth FC-AL controller.

11. The FC-AL communication network of claim 10, further including a fourth FC-AL mass storage drive having ninth and tenth FC-AL controllers, each FC-AL controller having at least four Fibre Channel (FC) loops as outputs, wherein a second output of the third FC-AL controller is coupled to a first input of the ninth FC-AL controller, a second output of the fifth FC-AL controller is coupled to a second input of the ninth FC-AL controller, a second output of the fourth FC-AL controller is coupled to a first input of the tenth FC-AL controller, and a second output of the sixth FC-AL controller is coupled to a second input of the tenth FC-AL controller.

12. The FC-AL communication network of claim 11, further including:
   a fifth FC-AL mass storage drive having eleventh and twelfth FC-AL, each FC-AL controller having at least four Fibre Channel (FC) loops as outputs, controllers, wherein a third output of the third FC-AL controller is coupled to a first input of the eleventh FC-AL controller, a third output of the fifth FC-AL controller is coupled to a second input of the eleventh FC-AL controller, a third output of the fourth FC-AL controller is coupled to a first input of the twelfth FC-AL controller, and a third output of the sixth FC-AL controller is coupled to a second input of the twelfth FC-AL controller; and
   a sixth FC-AL mass storage drive having thirteenth and fourteenth FC-AL controllers, each FC-AL controller having at least four Fibre Channel (FC) loops as outputs, wherein a fourth output of the third FC-AL controller is coupled to a first input of the thirteenth FC-AL controller, a fourth output of the fifth FC-AL controller is coupled to a second input of the thirteenth FC-AL controller, a fourth output of the fourth FC-AL controller is coupled to a first input of the fourteenth FC-AL controller, and a fourth output of the sixth FC-AL controller is coupled to a first second of the fourteenth FC-AL controller.

13. The FC-AL communication network of claim 12, further including:
   a first mass storage device coupled to the seventh FC-AL controller and to the eighth FC-AL controller;
   a second mass storage device coupled to the ninth FC-AL controller and to the tenth FC-AL controller;
   a third mass storage device coupled to the eleventh FC-AL controller and to the twelfth FC-AL controller; and
   a fourth mass storage device coupled to the thirteenth FC-AL controller and to the fourteenth FC-AL controller.

* * * * *